June 28, 1960 — H. E. GOLDBERG — 2,942,345
GRATICULE HOLDING DEVICES
Filed Aug. 31, 1955 — 2 Sheets-Sheet 1
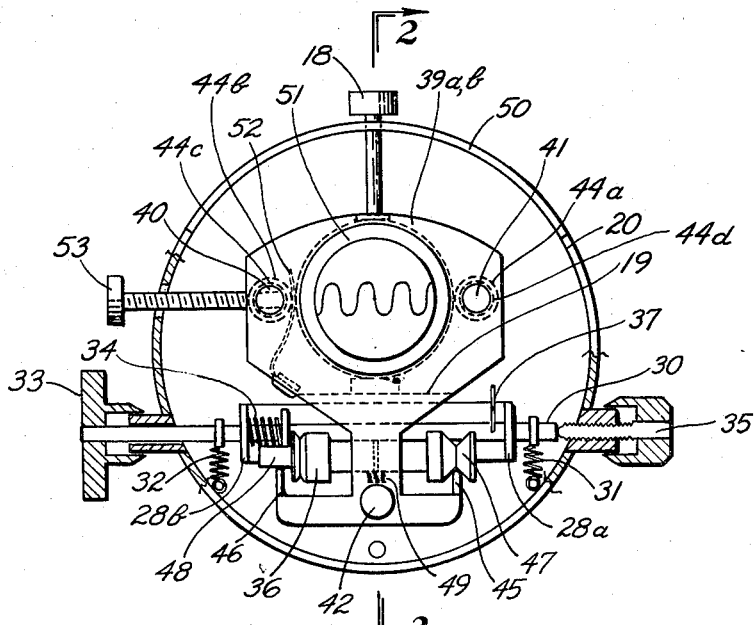
Fig. 1
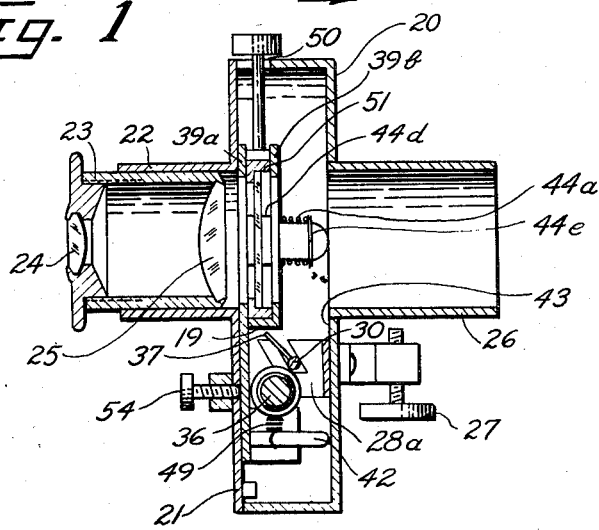
Fig. 2 — SEC 2-2
INVENTOR.
BY Herbert Goldberg June 28, 1960   H. E. GOLDBERG   2,942,345
GRATICULE HOLDING DEVICES
Filed Aug. 31, 1955   2 Sheets-Sheet 2

INVENTOR.
BY Hubert Goldberg

2,942,345

GRATICULE HOLDING DEVICES

Herbert E. Goldberg, 11 Woodchuck Hill Road,
West Simsbury, Conn.

Filed Aug. 31, 1955, Ser. No. 531,647

5 Claims. (Cl. 33—46)

This invention refers to microscopes, telescopes and similar optical systems used for purposes of inspection, measurement, comparison, or locating of objects or mechanical parts. In general such instruments function by forming a real optical image on a diaphragm, reticle or graticule, located within the optical system, and permitting comparison between the optical image and the graticule visually or photoelectrically.

To make this comparison it is usually necessary to open the instrument to insert a suitable graticule into it, and to move the instrument or the object until some relevant points of the image coincide with corresponding outlines or marks on the graticule. Some telescope eyepieces contain a number of graticules on a slide or a disk which may be moved through the field of view. However, these standard eyepieces cannot provide graticules with the many special outlines needed in laboratory and tool room work. Adjustment for coincidence remains time consuming because it is generally difficult, if not impossible, to move a bulky instrument by the minute distances required.

It is an object of this invention to provide a graticule carrier into which various graticules may be inserted from the outside conveniently.

It is another object of this invention to provide mechanisms by which the positions of a graticule relative to an optical image formed on it may be adjusted quickly and accurately.

It is still further an object of this invention to provide mechanisms by which the movement of the graticule may be measured.

I attain these objects by the mechanisms illustrated in the accompanying drawings, in which:

Figure 1 is a plane view with cover removed of an embodiment of the invention providing for movement of the graticule along rectangular coordinates.

Figure 2 is a cross sectional view of the embodiment of Figure 1 taken along line 2—2.

Figure 5:
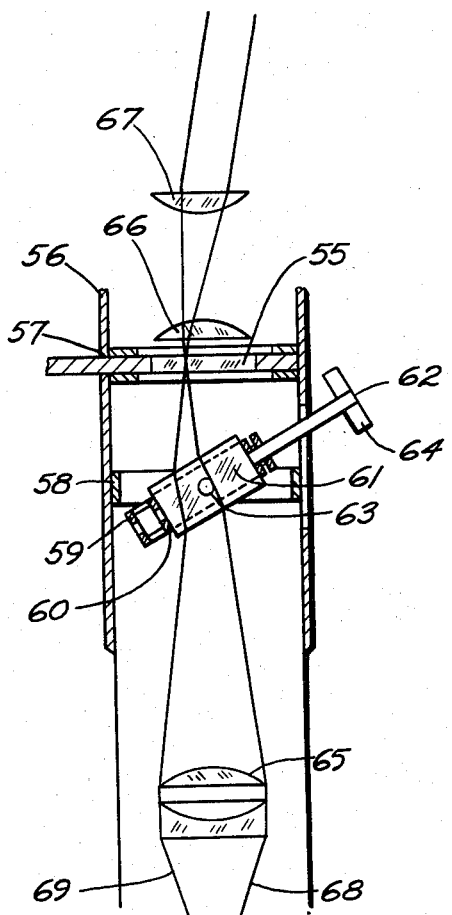
Figure 5 is an embodiment of the invention providing for motion of the optical image.

Referring now to Figures 1 and 2, 20 is the main casing of the device, 21 is a cover plate which is held down by screws not shown in the drawing. A slotted tube 22 resiliently holds an ocular 23 composed of an eye lens 24 and a field lens 25. Focusing for individual observers is accomplished by sliding the ocular 23 along tube 22.

To the main housing 20 there is also fastened a tube 26 which fits into a standard microscope body not shown in the drawing. It may be clamped to the microscope tube by a screw 27.

A pair of yokes 28a and 28b are fastened to the casing 20. The yokes 28a, b, support a main rod 30 which is urged into the yokes by springs 31 and 32, but is free to slide along its own axis and to rotate about it. A control knob 33 is fastened to the main rod 30, and a spring 34 urges this assembly against control screw 35.

A secondary rod 36 is soldered or otherwise fastened to main rod 30, the axes of both rods being parallel with each other. If main rod 30 is rotated about its own axis, secondary rod 36 will move on the surface of a cylinder with main rod 30 as axis, both rods remaining always parallel relative to each other. A stop 37 attached to main rod 30 limits the arc of travel, usually to less than 180 degrees, by striking the cover 21 or the surface 43 of the casing 20.

Rods 30 and 36 form one member of the graticule carrier. A second member of the graticule carrier is formed by the graticule holding carriage which consists of plates 39a, 39b and three legs 40, 41, 42 which are fastened to plate 39a. It is similar to a three legged stool and is allowed to rest and slide on surface 43 of casing 20.

Legs 41 and 42 pass through and carry plate 39b, two spacing washers 44c and 44d, two coil springs 44a and 44b and two spring retainers 44e. Plate 39b is urged by springs 44a and 44b against the spacing washers 44c and 44d and plate 39a. The spacing washers 44c and 44d thus maintain a spacing between plates 39a and 39b into which a graticule may be inserted as explained below.

Two protruding edges 45 and 46 of the graticule holder are urged against bearing surfaces formed by the groove 47 and the surface 48 of the secondary rod 36 by a spring 49.

It is seen that when main rod 30 is rotated under action of control knob 33 which is fastened to main rod 30 the graticule holders 39a, b, will follow the vertical component of the movement of secondary rod 36. The graticule holder will also participate in any horizontal motion of the main rod 30 under action of control screw 35.

Figure 3:
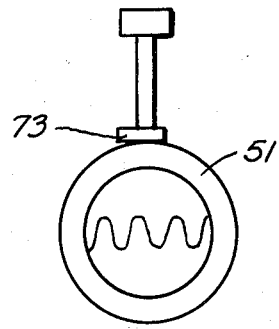
Figure 3 is a view of a graticule as used in the mechanisms shown in Figures 1, 2, and 5.

The casing 20 is provided with a slot 50 through which a graticule 51 shown in Figure 3 may be inserted into the graticule holder 39a, b, shown in Figure 2. A flat spring 52 (Figure 1) urges the graticule against ring 44d and lip 19, turned upward from lower edge of plate 39b, which act as stop members to position the graticule on the graticule holding carriage. The graticule may be rotated by adjusting the position of handle 18 which protrudes through slot 50 in order to orient it with respect to the directions of displacement. The graticule may then be locked against further rotation by tightening screw 53 (Figure 1) which passes through leg 40 and spacing washer 44c, surrounding it, and bears against flat spring 52.

After adjustment of the vertical and horizontal position of the graticule holder 39a, b, it too may be secured against further displacement by means of locking screw 54.

Figure 4:
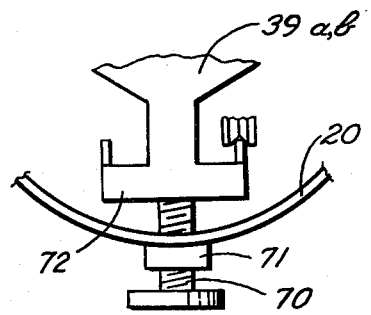
Figure 4 shows an alternate way of controlling the motion of the graticule holder shown in Figure 1.

The embodiment of the invention just described has the disadvantage that one of the control knobs is attached to a moving member. In case of the device shown in Figures 1 and 2 this may be overcome by arranging the vertical control as shown in Figure 4.

In this case the vertical motion of the holder 39a, b, is controlled by screw 70 which runs in a nut 71, fastened to casing 20, and bears against surface 72 of the graticule holder 39a, b.

In order to prevent vertical motion of the holder 39a, b, under action of the horizontal control screw 35 it is of course necessary that the surface 72 be located parallel to the direction of horizontal motion.

The eyepiece assembly just described is fitted to a conventional microscope by removing the ocular from the microscope, substituting the device described and inserting a Ramsden type ocular into the tube 22. After placing a suitable graticule into the slot 50 of the main housing 20 the observer may adjust its position with respect to the image by turning controls 33 and 35. The graticule moves then in two directions at right angles to each other. It may be rotated as described or by turning the main housing 20 in the microscope body. If the desired position has been reached the reticle may be locked in any position by tightening the clamping screws 27, 53 and 54.

A Huygens type ocular system may of course be used if a field lens is provided in tube 26.

In some instruments the reticle may be located too far from the eyepiece to allow easy manipulation of the control knobs and screws as just described and shown in the respective drawings. In these cases it may be more convenient to displace the optical image with respect to a fixed graticule rather than the graticule with respect to a fixed image as shown heretofore. Figure 5 illustrates such an arrangement.

A reticle 55 may be inserted into the main tube 56 through a slot 57 provided for this purpose. The reticle 55 may be rotated in its own plane within the main tube 56 by moving the reticle handle protruding through slot 57, and locked in position for instance by turning cam 73 shown in Figure 3 and thus wedging cam 73 between the upper and lower lips of the graticule carrier.

The main tube 56 also carries a set of gimbel rings 58, 59, and 60. A plane-parallel prism of glass 61 is fastened to the inner gimbel ring 60. It may be tilted by rotating the shafts 62 and 63 which are perpendicular to each other. The angle of tilt is controlled by control knob 64 and another knob which is fastened to shaft 63, but not shown in the drawing.

Objective 65 forms a real image in the plane of the graticule 55 which is then viewed in the usual way by the eyepiece lenses 66 and 67. It is seen from the light rays 68, 69, traced schematically in the figure that the optical image formed on the graticule is displaced laterally because the prism 61 is tilted. The displacement is of course proportional to the thickness of the prism and also depends on its refractive index.

Prism 61 may be replaced by two separate prisms. Each of them would tilt about one axis only and in mutually perpendicular directions. The light would pass first through one and then through the other of these separate prisms.

Finally it is advantageous in some cases to combine the mechanical and the optical methods of causing displacement between a graticule and an optical image. This case is illustrated in Figure 6.

Figure 6:
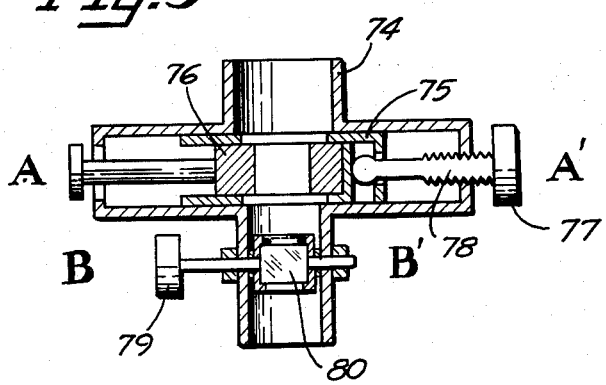
Figure 6 shows an embodiment of the invention where displacement in one direction is caused by mechanical means, whereas displacement in the other direction is caused optically.

In Figure 6, part 74 is a casing, 75 a graticule holder, and 76 a graticule. The screw 78 moves the holder 75 along the direction AA' when control knob 77 is turned. A second control knob 79 causes a tilting motion of the prism 80 about axis BB' and thus causes displacement of the optical image in a direction normal to both AA' and the plane of the paper.

Having thus described my invention, what I claim as new and desire to secure by Letters Patent is:

1. A graticule holding device comprising a casing, a graticule, said graticule having an edge, a graticule carrier within said casing adapted to removably retain said graticule, said carrier including at least two fixed stop members for contacting said edge on at least two points spaced apart from each other, moveable positioning means on said graticule carrier exerting pressure on said graticule in a direction parallel to the plane of said graticule so as to positively urge said edge into contact against said two points, a first displacement means operable from outside said casing for displacing said graticule carrier in one coordinate in its own plane, a second displacement means operable from outside said casing for displacing said graticule carrier in a second coordinate in its own plane, an opening in said casing separated from said two displacement means and in alignment with said graticule carrier through which said graticule can be inserted or removed independently of said two displacement means.

2. A graticule holding device as claimed in claim 1, said edge of said graticule having a portion circular in shape, said graticule including handle means for rotating said graticule in its own plane, said handle means being operable from outside said casing through said opening.

3. A graticule holding device as claimed in claim 1, said positioning means being spring means, and said graticule carrier including a lock member acting on said spring means for fixing the position of said graticule with respect to said graticule carrier, said lock member being actuable from outside said casing.

4. A graticule holding device as claimed in claim 1, said graticule carrier comprising a first member and a second member, both acted upon by said first displacement means for movement in said first coordinate, said second member including said graticule and acted upon by said second displacement means for displacing said second member and said graticule with respect to the first member in said second coordinate, said second displacement means bearing on a face of said second member, said face being parallel to said first coordinate.

5. A graticule holding device as claimed in claim 1, said first carrier member including bearing surfaces at least portions of which are axially centered on either one of two spaced apart axes, parallel to each other and to said first coordinate.

References Cited in the file of this patent

UNITED STATES PATENTS

| | | |
|---|---|---|
| 618,161 | Brightmore | Jan. 24, 1899 |
| 2,302,444 | Howell | Nov. 17, 1942 |
| 2,458,831 | Cady | Jan. 11, 1949 |
| 2,496,045 | Ford | Jan. 31, 1950 |
| 2,511,975 | French et al. | June 20, 1950 |
| 2,682,804 | Clifford | July 6, 1954 |
| 2,690,015 | Edwards | Sept. 28, 1954 |

FOREIGN PATENTS

| | | |
|---|---|---|
| 28,194 | Great Britain | 1911 |
| 428,618 | Germany | May 10, 1926 |